United States Patent [19]

Maucher et al.

[11] 4,429,776
[45] Feb. 7, 1984

[54] FRICTION CLUTCH

[75] Inventors: Paul Maucher, Sasbach; Patrick Weydmann, Bühlertal, both of Fed. Rep. of Germany

[73] Assignee: Luk Lamellen und Kupplungsbau GmbH, Bühl, Fed. Rep. of Germany

[21] Appl. No.: 232,246

[22] Filed: Feb. 6, 1981

[30] Foreign Application Priority Data

Feb. 6, 1980 [DE] Fed. Rep. of Germany ....... 3004277

[51] Int. Cl.³ .................... F16D 13/50; F16D 13/56
[52] U.S. Cl. .................. 192/99 A; 192/48.8; 192/70.3
[58] Field of Search .............. 192/48.7, 48.8, 70.18, 192/70.21, 70.25, 70.29, 70.3, 99 A

[56] References Cited

U.S. PATENT DOCUMENTS

| | | | |
|---|---|---|---|
| 1,665,554 | 4/1928 | Kolb | 192/70.29 X |
| 1,985,301 | 12/1934 | Thelander et al. | 192/70.3 X |
| 2,076,425 | 4/1937 | Brock | 192/70.3 |
| 3,061,062 | 10/1962 | Smirl | 192/70.18 |
| 3,539,047 | 11/1970 | Hermanns | 192/70.3 X |
| 3,779,353 | 12/1973 | Maucher | 192/70.3 X |
| 4,131,187 | 12/1978 | Smith et al. | 192/70.3 X |
| 4,191,285 | 3/1980 | Thelander et al. | 192/70.25 X |
| 4,238,019 | 12/1980 | Maucher et al. | 192/48.8 |

FOREIGN PATENT DOCUMENTS 2264254 7/1974 Fed. Rep. of Germany ..... 192/70.3

Primary Examiner—Rodney H. Bonck
Attorney, Agent, or Firm—Kontler, Grimes & Battersby

[57] ABSTRACT

A friction clutch wherein several changeover levers which are made of sheet metal are interposed between the housing on the one hand and the two pressure plates on the other hand. Each changeover lever has two arms with convex surfaces which can roll along flat surfaces of the respective pressure plates and a median portion which cooperates with a fulcrum on the housing. When one of the pressure plates is moved away from the associated friction disc, the changeover levers roll along the associated fulcra and cause the other pressure plate to move away from the respective friction disc. If the clutch is a dependent-operated friction clutch, the fulcra and the median portions of the respective changeover levers define adjustable clearances in engaged condition of the clutch.

48 Claims, 6 Drawing Figures

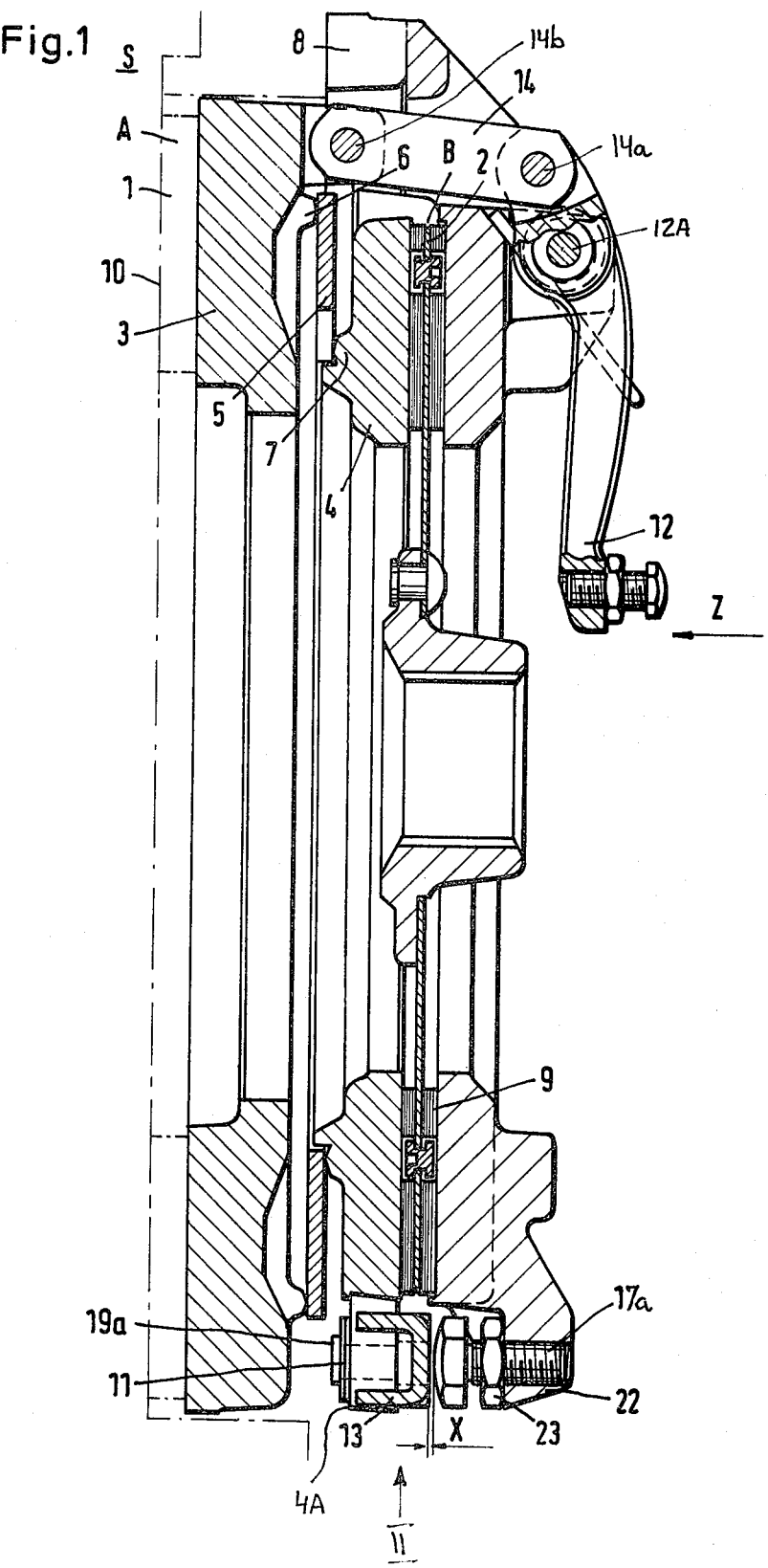

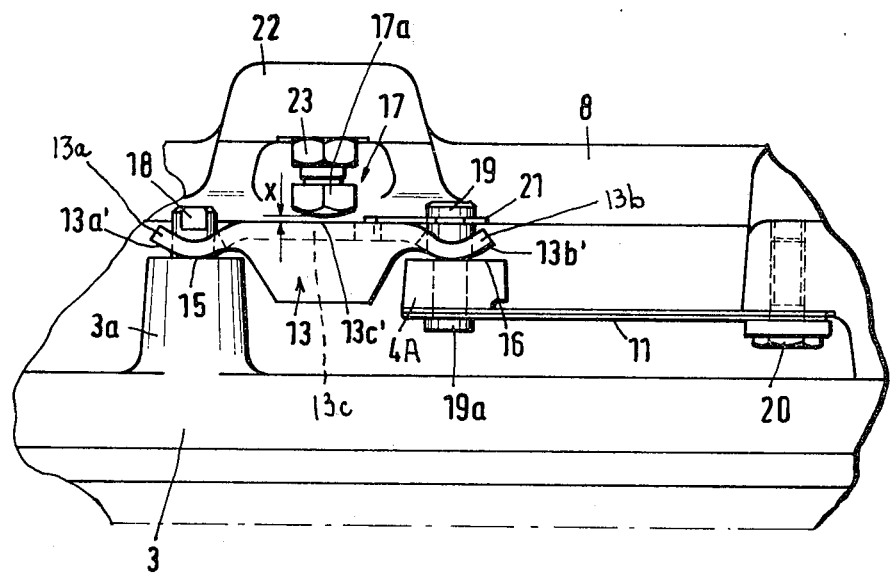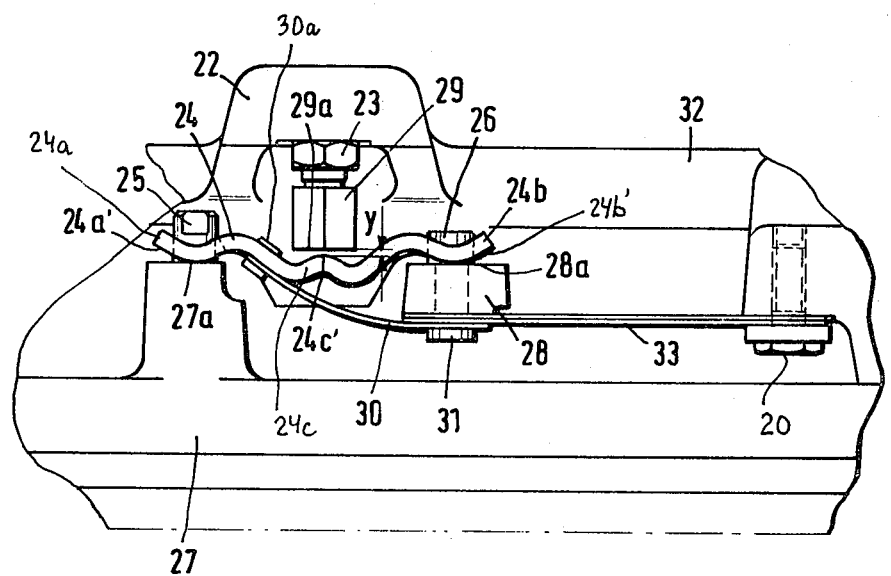

FRICTION CLUTCH

BACKGROUND OF THE INVENTION

The present invention relates to friction clutches in general, and more particularly to improvements in friction clutches with two friction clutch units. Such clutches can be used in automotive vehicles to perform several functions, for example, to connect or disconnect the input element of a change-speed transmission with the output element of the internal combustion engine as well as to transmit or terminate the transmission of torque to a piece of auxiliary equipment, e.g., to a power take-off.

A friction clutch of the above outlined character has two friction discs, one for each unit, and a discrete pressure plate for each friction disc. A spring (e.g., a dished spring) is installed between the pressure plates and serves to urge each pressure plate against the respective friction disc. A common housing is provided for the two units of the clutch, and a surface of the housing is adjacent to and engages with one of the friction discs. The other friction disc is adjacent to a surface of the flywheel which is driven by the internal combustion engine of the vehicle. The housing of the clutch is attached to and rotates with the flywheel. The housing transmits torque to both pressure plates and carries the means for disengaging the two units when the need arises. In conventional clutches, the disengaging means comprises a set of release levers which are pivotally mounted on the housing and can be actuated to move one of the pressure plates away from the associated friction disc. A second set of levers (hereinafter called changeover levers) is employed to act between the housing on the one hand and the two pressure plates on the other hand in such a way that they compel the other pressure plate to move away from the adjacent friction disc when the one pressure plate is disengaged by the release levers.

A drawback of presently known clutches of the above outlined character is that the auxiliary levers contribute excessively to the initial and maintenance cost of the clutches. Reference may be had to German Offenlegungsschrift No. 2,264,254 which discloses metallic changeover levers each of which must be machined with a very high degree of precision. Thus, each such lever must be treated in one or more complex material removing machine tools. The changeover levers are mounted for pivotal movement on shafts which are provided on or secured to the housing of the clutch. The solid and bulky changeover levers are heavy so that they cannot be used in clutches which operate at high rotational speeds unless the supports for such levers are designed with a requisite degree of sturdiness. This, in turn, contributes to the cost and weight of the clutch. In addition to the aforedescribed drawbacks, changeover levers of the type disclosed in the German publication necessitate the provision of other precision-finished parts, such as the shafts on which the levers turn with reference to the housing of the clutch. The changeover levers must turn with a minimum of clearance, i.e., their bearing surfaces as well as the surfaces of the shafts must be machined with utmost precision.

FIG. 3 of the aforementioned German publication shows a simplified changeover lever which exhibits a number of drawbacks. Those portions of the lever which cooperate with the pressure plates are offset with reference to each other, as considered in the axial direction of the housing; this entails a sliding movement between the lever and the pressure plates when the clutch is actuated so that the wear upon the lever and the adjacent surfaces of the pressure plates is very pronounced.

OBJECTS AND SUMMARY OF THE INVENTION

An object of the invention is to provide a novel and improved friction clutch with two clutch units which is constructed and assembled in such a way that it can employ simple and inexpensive changeover levers between the pressure plates.

Another object of the invention is to provide novel and improved changeover levers for use in a friction clutch.

A further object of the invention is to provide a novel and improved mounting for changeover levers in the housing of a friction clutch.

An additional object of the invention is to provide a friction clutch which can be operated at any one of a wide range of rotational speeds even though it utilizes simple and inexpensive changeover levers.

Another object of the invention is to provide a friction clutch wherein the changeover levers need not be mounted with a high degree of precision and this does not affect the accuracy of their operation and/or their useful life.

An ancillary object of the invention is to provide a friction clutch wherein the changeover levers are subjected to less pronounced wear than in heretofore known double friction clutches.

An additional object of the invention is to provide a friction clutch which embodies the above outlined changeover levers and can employ or employs a large number of conventional components.

Another object of the invention is to provide a friction clutch whose changeover levers can be mass produced at a minimal cost and by resort to simple and readily available machinery.

A further object of the invention is to provide novel and improved pressure plates for use in a friction clutch of the above outlined character.

Another object of the invention is to provide a novel and improved housing or cover for use in the above outlined clutch and to provide novel and improved disengaging means for a friction clutch.

The invention is embodied in a friction clutch (e.g., in a dependent-operated friction clutch) which is especially suited for use in automotive vehicles. The clutch comprises a rotary driving element (e.g., a flywheel which is driven by the internal combustion engine of an automotive vehicle), a housing or cover which is secured (e.g., bolted) to the driving element, first and second pressure plates installed between the housing and the driving element and normally rotating with the driving element, first and second friction discs which are respectively interposed between the driving element and the housing on the one hand and the first and second pressure plates on the other hand, a dished spring which is interposed between the pressure plates or analogous means for biasing the pressure plates into engagement with the respective friction discs, and disengaging means including at least one release member (e.g., three equidistant two-armed release levers pivotally mounted at the outer side of the housing and having longer arms pivotable by a pedal or the like and shorter arms articulately connected with the first pressure plate by suitable links) mounted on the housing and movable relative to the housing from a first to a second position to thereby move one of the pressure plates away from the respective friction disc, and at least one changeover lever or auxiliary lever interposed between the housing on the one hand and the two pressure plates on the other hand and being movable from a first to a second position to thereby move the other of the two pressure plates away from the respective friction disc in response to movement of the release member to its second position. The changeover lever has first and second arms which respectively contact the first and second pressure plates and a median portion between the two arms. The housing has or carries a portion which defines a fulcrum for the median portion of the changeover lever during movement of the changeover lever to its second position. The changeover lever need not be fixedly connected to the housing, to the first pressure plate and/or the second pressure plate. The housing transmits torque to one or both pressure plates by way of suitable leaf springs or the like. The arms of the changeover lever are preferably formed with convex first surfaces which roll along second surfaces provided on the respective pressure plates during movement of the changeover lever from its first to its second position.

The friction clutch preferably further comprises a leaf spring or other suitable means for maintaining between the fulcrum and the median portion of the changeover lever a clearance of preferably adjustable width. Such clearance is established in automatic response to return movement of the changeover lever to its first position and must be reduced to zero before the median portion of the changeover lever can begin to roll along the fulcrum. Thus, one of the pressure plates must move the changeover lever toward the fulcrum during a first stage of movement of the release member from its first position, and the median portion of the changeover lever engages and rolls along the fulcrum during the next-following stage of movement of the release member to the second position, i.e., after the width of the clearance is reduced to zero. The changeover lever moves the other pressure plate away from the respective friction disc during the aforementioned second stage of movement of the release member to its second position.

In order to properly locate the changeover lever against movement in the axial, circumferential and/or radial direction of the housing and driving element, the pressure plates are preferably provided with suitable projections (e.g., pins) which can serve to guide the corresponding arms and may extend into open slots or otherwise configurated openings in the respective arms of the changeover lever. Such pins can extend in parallelism with the axis of the driving element.

The novel features which are considered as characteristic of the invention are set forth in particular in the appended claims. The improved clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a friction clutch which embodies one form of the invention;

FIG. 2 is a fragmentary end elevational view of the friction clutch as seen in the direction of arrow II in FIG. 1; and FIG. 3 is a similar fragmentary end elevational view of a modified friction clutch;

DESCRIPTION OF THE PREFERRED EMBODIMENTS

Figure 4:
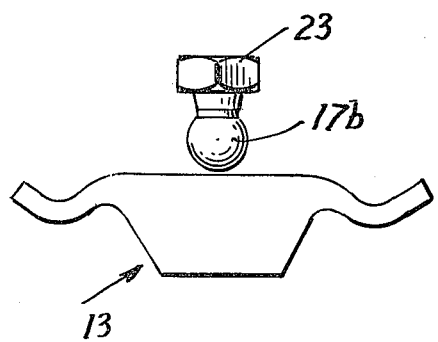
FIG. 4 is an elevational view of a changeover lever and a spherical fulcrum for the median portion of the changeover lever.

Referring first to FIG. 1, there is shown a friction clutch which comprises two units A and B. The clutch unit A serves to connect the output element of a prime mover (e.g., an internal combustion engine) with the input element of a variable-speed transmission or change-speed transmission, and the clutch unit B serves to transmit torque from the output element of the prime mover to an auxiliary drive, e.g., to a conventional power take-off (not shown).

The clutch unit A comprises a friction disc 1, and the clutch unit B comprises a friction disc 2. Furthermore, the clutch unit A comprises a pressure plate 3, and the clutch unit B comprises a pressure plate 4. The pressure plates 3, 4 are respectively provided with friction surfaces which engage the associated friction discs 1 and 2. A resilient element 5, here shown as a dished spring, is provided between the pressure plates 3 and 4 to respectively bias these plates against the friction discs 1 and 2. The radially outermost portions of the dished spring 5 bear against bead-like projections 6 at the adjacent side of the pressure plate 3, and the pressure plate 4 has an annulus of projections 7 which abut against the adjacent portions of the dished spring 5 radially inwardly of the projections 6. The spring 5 ensures that the pressure plates 3 and 4 normally bear against the respective friction discs 1 and 2.

The two units A and B of the friction clutch are installed in a common housing or cover 8 which has a friction surface 9 adjacent to and engaging the respective side of the friction disc 2. The friction surface 10 for the left-hand side of the friction disc 1, as viewed in FIG. 1, is provided on a flywheel S which is driven by the aforementioned prime mover and constitutes a driving element which rotates the housing 8. The fastener means (e.g., an annulus of bolts) for securing the housing 8 to the flywheel S is not specifically shown in the drawing.

The housing 8 rotates the pressure plate 4 through the medium of torque transmitting means in the form of leaf springs 11 (only one can be seen in FIG. 1). The means for releasing the friction clutch, i.e., for disengaging the pressure plates 3 and 4 from the respective friction discs 1 and 2, comprises several clutch release levers 12 (only one shown in FIG. 1) and an equal number of changeover levers 13. The friction clutch which is shown in FIGS. 1 and 2 is assumed to have three equidistant release levers 12 and three equidistant changeover levers 13 (as considered in the circumferential direction of the housing 8). Each release lever 12 is pivotally mounted on the housing 8 by means of a shaft 12A which extends at right angles to the axis of the clutch. The free end portions of the longer arms of the levers 12 can be depressed (see the arrow Z in FIG. 1) in order to disengage the pressure plate 3 from the friction disc 1, i.e., to move the pressure plate 3 away from the flywheel S. To this end, the shorter arms of the release levers 12 are articulately connected with the adjacent first or outer end portions of links 14 by pins 14a, and the inner end portions of such links are articulately connected with the pressure plate 3 by pins 14b. In other words, if the lever 2 which is shown in the upper right-hand portion of FIG. 1 is pivoted from the illustrated first position in a clockwise direction (arrow Z), the corresponding link 14 moves the pressure plate 3 in a direction to the right, i.e., away from the friction disc 1.

The changeover levers 13 serve to move the pressure plate 4 away from the friction disc 2 in response to movement of the pressure plate 3 away from the friction disc 1. Each changeover lever 13 is a profiled piece of sheet metal which can be manufactured at a low or reasonable cost. As shown in FIG. 2, the changeover lever 13 which is illustrated therein extends substantially tangentially of the pressure plates 3, 4 and has two end portions 13a, 13b with convex surfaces 13a', 13b' abutting against the adjacent flat surfaces 15, 16 of the pressure plates 3 and 4, respectively. The median or intermediate portion 13c of each changeover lever 13 can roll along a discrete fulcrum or pivot member 17 which is provided therefor on the housing 8. In other words, each changeover lever 13 is or can be said to constitute a two-armed lever with arms 13a, 13b whose convex surfaces 13a', 13b' contact or can contact the respective flat (complementary) surfaces 15, 16 on the pressure plates 3 and 4. In the embodiment of FIGS. 1 and 2, the pivot members or fulcra 17 are disposed midway between the end portions of the respective changeover levers 13; however, it is equally possible to shift the pivot members 17 away from the centers of the associated levers 13 so that each of these levers will have a shorter and a longer lever arm depending upon whether the axial movement of the pressure plate 3 should exceed the axial movement of the pressure plate 4 or vice versa i.e., each of the levers 13 can have a step-up or step-down ratio.

The pivot member 17 which is shown in FIG. 2 comprises a screw or bolt 17a whose head is normally separated from the median portion 13c of the illustrated changeover lever 13 by a clearance or gap X. When the pressure plate 3 is moved away from the friction disc 1 in response to pivoting of release levers 12 (from the first to the second positions) in the direction indicated by arrow Z, the median portion 13c of each changeover lever 13 must reduce the width of the clearance X to zero before it contacts the head of the respective bolt 17a. At such time, the lever 13 begins to lift the pressure plate 4 off the friction disc 2 in response to further movement of the pressure plate 3 away from the friction disc 1, i.e., during a second stage of movement of levers 12 from their first to their second positions.

The left-hand end portion or arm 13a of the changeover lever 13 shown in FIG. 2 has an opening (e.g., an open slot extending in the circumferential direction of the housing 8) for a portion of a retainer 18 which is a pin-shaped projection threadedly connected to by extending into a tapped bore of a raised portion of extension 3a of the pressure plate 3. The portion 3a extends in parallelism with the axis of the friction clutch and bears the surface 18. The projection 15 preferably extends into that portion of the opening in the arm 13a which is nearest to the fulcrum 17 and the width of the opening in the arm 13a (as considered in the radial direction of the flywheel) equals or approximates the corresponding dimension of the bolt 18. At any rate, the lever 13 is free to pivot through an angle which suffices to move the pressure plate 4 away from the friction disc 2 in response to disengagement of the pressure plate 3 from the friction disc 1.

Analogously, the right-hand end portion 13b or arm of the changeover lever 13 shown in FIG. 2 has a slot for a projection here shown as a retainer or pin 19 at least a portion of which can constitute an extension of a rivet 19a serving to fasten or couple one end portion of one of the torque transmitting leaf springs 11 to the pressure plate 4. The other end portion of the leaf spring 11 shown in FIG. 2 is separably secured to the housing 8 by a bolt 20 or an analogous fastener. Each of the retainers or projections 18 and 19 is preferably separably connected with the respective pressure plate (e.g., by threads) and also serves as a guide for the respective lever arm to hold the lever 13 against uncontrolled movements, especially under the action of centrifugal force. Moreover, the retainers or projections 18 and 19 can be readily configurated in such a way that they limit the changes in orientation of the changeover lever 13, as considered with reference to the axis of the bolt 17a forming part of the pivot member 17 shown in FIG. 2. In other words, the projections 18 and 19 can hold the changeover lever 13 against excessive turning about the axis of the bolt 17a. In the absence of projections 18 and 19, the changeover lever 13 would be likely to be expelled radially outwardly in response to the action of centrifugal force when the flywheel S receives torque from the prime mover. The surface 16 is provided on a radially outwardly extending portion 4A of the pressure plate 4 (see also FIG. 1).

The means for biasing the convex surfaces 13a', 13b' of the end portions or arms 13a, 13b of the changeover lever 13 against the respective complementary surfaces 15 and 16 and for thus limiting the extent of movement of the lever 13 in the axial direction of the flywheel S comprises a resilient element here shown as a leaf spring 21 which is held in position by the projection 19 and is stressed in a direction to urge the lever 13 downwardly, as viewed in FIG. 2, i.e., so as to establish the clearance X between the median portion 13c of the lever 13 and the head of the bolt 17a. The leaf spring 21 ensures that the lever 13 normally assumes a predetermined position and is maintained in a predetermined orientation with respect to the pressure plates 3 and 4, as considered in the axial direction of the friction clutch. It will be noted that the projection 19 constitutes a means for fastening the leaf spring 21 to the pressure plate 4.

The bolt 17a of the pivot member 17 for the median portion 13c of the auxiliary lever 13 shown in FIG. 2 is installed in a radial extension or projection 22 of the housing 8. Such extension overlies the respective lever 13. The selected axial position of the bolt 17a can be fixed by a lock nut 23 which is tightened when the friction clutch is in use but is loosened when the operator wishes to change the width of the clearance X. The bolt 17a is shielded by the respective extension 22 of the housing 8 but its head, as well as the associated lock nut 23, is readily accessible when the operator considers it necessary to adjust the width of the clearance X.

The head of the pivot member 17a on the housing 8 may have a convex surface which is contacted by the adjacent surface 13c' on the median portion 13c of the changeover lever 13 during that stage of movement of the lever 13 from its first to its second position when the width of the clearance X is zero, i.e., during a second stage of movement of the release lever 12 from its first to its second position. The convex surface on the head of the bolt 17a may form part of a sphere or a roller, and the median portion 13c of the changeover lever 13 can have a surface (instead of the surface 13c') which is complementary to the convex (spherical or cylindrical) surface of the head of the bolt 17a. Thus, the upper side of the median portion 13c is then formed with a concave surface which is complementary to the convex surface at the underside of the head of the bolt 17a.

The improved clutch exhibits the advantage that the changeover levers 13 can be produced at a surprisingly low cost and that the mounting of such levers between the housing 8 on the one hand and the pressure plates 3, 4 on the other hand is extremely simple. Thus, the changeover levers 13 need not pivot on shafts, pins or like parts so that they need not be machined with surfaces which accurately conform to the outlines of surfaces on such pins or shafts.

The provision of a clearance X between the median portion 13c of each changeover lever 13 and the respective fulcrum 17 is desirable and advantageous in dependent-operated friction clutches wherein the disengagement of one of the pressure plates from the respective friction disc is followed by disengagement of the other pressure plate from the associated friction disc. In the embodiment of FIGS. 1-2, the pressure plate 3 is coupled to the release levers 12 by the links 14 so that it is or can be disengaged from the friction disc 1 before the width of the clearance X is reduced to zero, i.e., before the levers 13 cause the pressure plate 4 to move away from the associated friction disc 2.

The projection 18 is provided on the pressure plate portion 3a which extends in parallelism with the axis of the flywheel S. On the other hand, the projection 19 is provided on a pressure plate portion 4A which extends in the radial direction of the flywheel S. The surfaces 15 and 16 are preferably coplanar or substantially coplanar in the first position of the lever 13.

Figure 5:
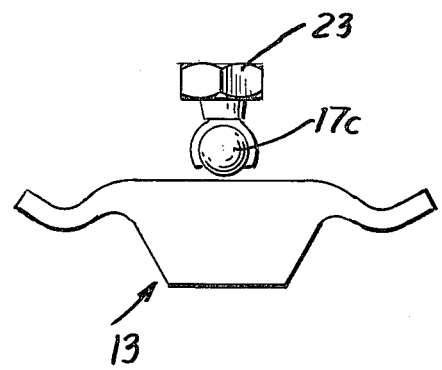
FIG. 5 is an elevational view of a changeover lever and a roller-shaped fulcrum for the median portion of the changeover lever.
Figure 6:
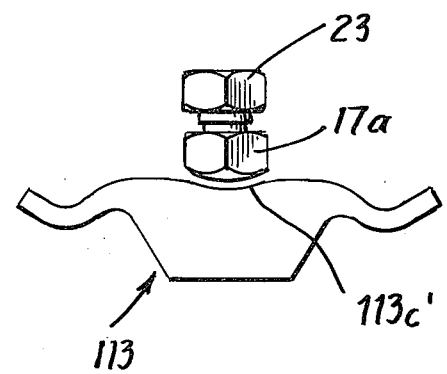
FIG. 6 is an elevational view of a changeover lever and a fulcrum similar to that of FIG. 2 but engageable with a concave surface on the median portion of the changeover lever.

Each of the changeover levers 13 can be mass-produced by resorting to available stamping or punching machines. It goes without saying that the convex surfces 13a', 13b' can be replaced with flat or substantially flat surfaces if the surfaces 15 and 16 are convex (cylindrical or spherical). All that counts is to ensure that the surfaces 13a' and 13b' can roll along the corresponding surfaces 15, 16 when the changeover lever 13 of FIG. 2 is caused to pivot about the head of the bolt 17a. At such time, the flat or concave surface of the median portion of the changeover lever rolls along the convex surface of the bolt 17a. FIG. 6 shows a changeover lever 113 having a median portion with a concave surface 113c' arranged to roll along the spherical head surface of the bolt 17a. FIG. 4 shows that the flat surface of the median portion of the changeover lever 13 can roll along the spherical head 17b of a bolt, and FIG. 5 shows that the flat surface of the median portion of the changeover lever 13 can roll along a roller 17c of the bolt.

FIG. 3 shows a portion of a modified friction clutch having a somewhat different changeover lever 24. The end portions or arms 24a and 24b of the lever are again provided with convex surfaces 24a', 24b' which normally contact flat surfaces 27a, 28a on the respective pressure plates 27 and 28. The end portions 24a and 24b have openings for and are guided by retainers or projections 25, 26 which are separably secured to the corresponding pressure plates 27 and 28. Again, the projections 25 and 26 hold the changeover lever 24 against ejection from the clutch housing 32 under the action of centrifugal force, and these projections also hold the lever 24 against excessive turning about the axis of the associated pivot member of fulcrum 29 which is adjacent to the median portion 24c of the lever 24. The median portion 24c of the lever 24 is a bead which is obtained as a result of appropriate deformation of the metallic sheet-like material of the lever and is normally spaced apart from the pivot member 29 so that the parts 24c and 29 define a clearance or gap Y of desired width. Such width can be changed by loosening the lock nut 23 and by thereupon adjusting the axial position of the pivot member 29 relative to the extension 22 of the housing 32. The pivot member 29 has a threaded shank which meshes with the lock nut 23 and extends into a tapped bore at the inner side of the extension 22. When the pressure plate 27 is moved away from the associated friction disc (by way of release levers 12 and links 14 which are not shown in FIG. 3), the changeover lever 24 of FIG. 3 is moved toward the flat surface 29a of the pivot member 29 to reduce the width of the clearance Y to zero before the pressure plate 27 can move the pressure plate 28 in response to pivoting of the lever 24 at 24c. The median portion 24c of the lever 24 has a convex (cylindrical or spherical) surface 24c' which rolls along the flat surface 29a during a given stage of movement of the lever 24 from its first to its second position.

The means for urging the changeover lever 24 to the position which is shown in FIG. 3 (i.e., so as to establish and maintain the clearance Y) comprises a leaf spring 30 which is riveted to the pressure plate 28 as well as to the lever 24 (at 30a). The mounting of the leaf spring 30 is such that the convex surfaces 24a', 24b' of the respective end portions 24a, 24b or arms of the lever 24 are urged against the adjacent flat surfaces 27a and 28a. The leaf spring 30 can further serve as a means for guiding the lever 24, as considered in the circumferential and/or axial direction of the friction clutch.

The right-hand end portion of the leaf spring 30, as viewed in FIG. 3, is secured to the pressure plate 28 by a rivet 31 which can further perform the function of the rivet 19a shown in FIG. 2, i.e., to connect or couple one end portion of the adjacent torque transmitting leaf spring 33 to the pressure plate 28. The other end portion of the leaf spring 33 is connected to the housing 32 by a fastener 20. In order to further simplify the construction of the clutch, i.e., to reduce the number of necessary parts, the upper end portion of the rivet 31 (as viewed in FIG. 3) constitutes the retainer or projection 26 and guide means for the end portion or arm 24b of the lever 24. At least a portion of the projection 26 forms part of the rivet 31, An important advantage of the embodiment which is shown in FIG. 3 is that the beaded median portion 24c of the changeover lever 24 can establish a linear contact with the surface 29a of the pivot member 29 when the width of the clearance Y is reduced to zero. This is desirable in order to ensure satisfactory rolling movement of the lever 24. Another advantage of the structure which is shown in FIG. 3 is that, when the clutch is engaged, the end portions 24a, 24b are coplanar or substantially coplanar with the median portion 24c of the lever 24 in engaged condition of the clutch (they are then located in a plane which is normal to the axis of rotation of the clutch). Consequently, when the clutch is in the process of being disengaged, the relative movement between the contact points between the surfaces 24a'-27a, 24b'-28a, 24c'-29a is negligible. This is desirable for several reasons, e.g., in order to reduce the wear as a result of rubbing between the changeover lever 24 on the one hand and the pressure plates 27, 28 and pivot member 29 on the other hand.

An advantage of the leaf spring 30 is that it reduces the likelihood of noise when the friction clutch embodying the structure of FIG. 3 is in actual use. This is due to the fact that the rivet 30a positively couples the leaf spring 30 to the changeover lever 24. It normally suffices to positively connect the lever 24 with one of the pressure plates but it is equally within the purview of the invention to provide a positive connection between the lever 24 and each of the plates 27, 28 as long as such connections (which preferably include resilient means) do not interfere with rolling movement between the arms 24a, 24b and the respective pressure plates 27, 28 as well as between the median portion 24c and the fulcrum 29. The spring 30 urges the surfaces 24a', 24b' against the adjacent flat surfaces 27a and 28a.

Adjustability of the fulcra 17 and 29 relative to the corresponding extensions 22 is advisable and advantageous for several reasons, e.g., to allow for accurate selection of the width of the clearance X and Y as well as to enable an attendant or the operator to compensate for wear upon the parts which form or engage the fulcra.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehend within the meaning and range of equivalence of the appended claims.

We claim:

1. A friction clutch for use in automotive vehicles or other machines of the type having a rotary driving element, comprising a housing secured to said element; first and second pressure plates disposed between said housing and said element and arranged to normally rotate with said element; first and second friction discs respectively interposed between said element and said housing on the one hand and said first and second plate on the other hand; means for biasing said plates into engagement with the respective discs; and disengaging means including at least one release member mounted on said housing and movable from a first to a second position to thereby move one of said plates away from the respective disc, and at least one changeover lever interposed between said housing on the one hand and said plates on the other hand and movable from a first to a second position to thereby move the other of said plates away from the respective disc in response to movement of said release member to said second position, said lever having first and second arms respectively contacting said first and second plates and a median portion between said arms, said housing having a portion defining a fulcrum for said median portion of said lever during movement of said lever to said second position, said arms having first surfaces and said pressure plates having second surfaces which abut against and along which the respective first surfaces roll during movement of said lever relative to said fulcrum, said median portion of said lever being free to perform a pivotal as well as at least one additional movement with reference to said fulcrum.

2. The clutch of claim 1, wherein said biasing means comprises a dished spring which is interposed between said pressure plates and said driving element includes a flywheel.

3. The clutch of claim 1, further comprising means for transmitting torque from said housing to said pressure plates, said disengaging means comprising a plurality of release members on said housing and a plurality of changeover levers.

4. The clutch of claim 1, wherein said arms have openings and said pressure plates include projections extending into the openings of the respective arms.

5. The clutch of claim 4, wherein said projections include pins and extend in substantial parallelism with the axis of said driving element.

6. The clutch of claim 4, wherein said openings extend substantially in the circumferential direction of said housing.

7. The clutch of claim 6, wherein the width of each of said openings, as considered in the radial direction of said driving element, matches or at least approximates the corresponding dimension of the respective projection.

8. The clutch of claim 6, wherein each of said openings has a portion nearest to the other opening and said projections are received in such portions of the respective openings.

9. The clutch of claim 4, further comprising torque transmitting means connecting at least one of said pressure plates to said housing and means for coupling said torque transmitting means to said last mentioned plate, one of said projections forming part of said coupling means.

10. The clutch of claim 9, wherein said torque transmitting means comprises a leaf spring and said coupling means comprises a rivet, said rivet having an extension which constitutes said one projection.

11. The clutch of claim 4, wherein at least one of said plates has a portion extending radially outwardly of said driving element and the corresponding projection is provided on such radially outwardly extending portion.

12. The clutch of claim 11, wherein said last mentioned projection is separably secured to said radially outwardly extending portion.

13. The clutch of claim 4, wherein at least one of said pressure plates has an extension substantially parallel to the axis of said driving element and the corresponding projection is provided on such extension.

14. The clutch of claim 13, wherein said last mentioned projection is separably secured to said extension.

15. The clutch of claim 1, wherein said changeover lever consists of profiled sheet metal.

16. The clutch of claim 1, wherein said first surfaces are convex surfaces.

17. The clutch of claim 1, wherein said median portion and said arms are disposed in a common plate which is at least substantially normal to the axis of said driving element in the first position of said lever.

18. The clutch of claim 1, further comprising means for limiting the extent of movement of said lever in the circumferential and axial directions of said driving element.

19. The clutch of claim 1, wherein said housing comprises a projection extending substantially radially outwardly of said driving element and said fulcrum is provided on said projection.

20. The clutch of claim 19, wherein said fulcrum has a portion which meshes with said projection.

21. A dependent-operated friction clutch for use in automotive vehicles or other machines having a rotary driving element, comprising a housing secured to said driving element; first and second pressure plates disposed between said housing and said element; first and second friction discs respectively interposed between said element and said housing on the one hand and said first and second plates on the other hand; means for biasing said plates into engagement with the respective discs; and disengaging means including at least one release member mounted on said housing and movable from a first to a second position to thereby move one of said plates away from the respective disc, means for connecting said release member to said one pressure plate, at least one changeover lever interposed between said housing on the one hand and said pressure plates on the other hand and movable from a first to a second position to thereby move the other of said pressure plates away from the respective disc in response to movement of said release member to said second position, said lever having first and second arms respectively contacting said first and second pressure plates and a median portion between said arms, said housing having a portion defining a fulcrum for said median portion of said lever during movement of said lever to said second position, and means for maintaining between said fulcrum and said median portion of said changeover lever a clearance in the first position of said lever.

22. The clutch of claim 21, wherein said one plate includes means for moving said median portion of said lever toward said fulcrum so as to reduce said clearance to zero in response to a first stage of movement of said release member from said first position, said lever being arranged to move said other plate away from the respective friction disc during the next-following stage of movement of said release member from said first position.

23. A friction clutch for use in automotive vehicles or other machines having a rotary driving element, comprising a housing secured to said element; first and second pressure plates disposed between said housing and said element and arranged to normally rotate with said element; first and second friction discs respectively interposed between said element and said housing on the one hand and said first and second pressure plates on the other hand; means for biasing said pressure plates into engagement with the respective discs; and disengaging means including at least one release member mounted on said housing and movable from a first to a second position to thereby move one of said plates away from the respective disc, and at least one changeover lever interposed between said housing on the one hand and said plates on the other hand and movable from a first to a second position to thereby move the other of said plates away from the respective disc in response to movement of said release member to said second position, said lever having first and second arms respectively contacting said first and second plates and a median portion between said arms, said housing having a portion defining a fulcrum for said median portion of said lever during movement of said lever to said second position, said arms further having openings and said pressure plates including projections extending into the openings of the respective arms, said projections including pins and extending in substantial parallelism with the axis of said element, said arms further having first surfaces and said pressure plates having second surfaces abutting against the first surfaces of the respective arms, said second surfaces being adjacent to the respective projections.

24. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, and at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, said fulcrum comprising a pivot member provided on said housing and having a convex surface contacting the median portion of said lever at least during a given stage of movement of said lever between said first and second positions thereof.

25. The clutch of claim 24, wherein said pivot member includes a sphere.

26. The clutch of claim 24, wherein said pivot member includes a roller.

27. The clutch of claim 24, wherein the median portion of said lever has a surface which is complementary to said convex surface.

28. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, and at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, said fulcrum comprising a pivot member provided on said housing and having a substantially flat surface which is contacted by the median portion of said lever at least during a given stage of movement of said lever between said first and second positions thereof.

29. The clutch of claim 28, wherein said median portion has a convex surface which contacts said flat surface during said stage of movement of said lever.

30. The clutch of claim 29, wherein said lever consists of sheet metal and said median portion of said lever is a bead in the material of such lever.

31. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective discs; and disengaging means including at least one release member mounted on said housing and movable from a first to a second position to thereby move one of said pressure plates away from the respective friction disc, at least one changeover lever interposed between said housing on the other hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, and means for limiting the extent of movement of said lever with respect to at least one of said pressure plates, as considered in the axial direction of said driving element.

32. The clutch of claim 31, wherein said limiting means comprises a resilient element.

33. The clutch of claim 32, wherein said resilient element includes a leaf spring secured to said last mentioned plate and to said lever.

34. The clutch of claim 31, wherein said pressure plates include projections engaging with the respective arms of said lever and further comprising means for fastening said limiting means to the respective plate, one of said projections being rigid with said fastening means.

35. The clutch of claim 34, wherein said fastening means comprises a rivet.

36. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, and means for yieldably urging said arms against the respective pressure plates.

37. The clutch of claim 55, wherein said urging means comprises a resilient element secured to one of said pressure plates.

38. The clutch of claim 37, wherein said pressure plates comprise projections engaging the respective arms, one of said projections including means for securing said resilient element to the respective pressure plate.

39. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, and means for limiting the extent of movement of said lever in the circumferential and axial directions of said driving element, said limiting means comprising a leaf spring.

40. The clutch of claim 56, further comprising means for securing said spring to one of said pressure plates.

41. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective disc, at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, said housing having a portion defining a fulcrum for said median portion of said lever during movement of said lever to said second position, means for limiting the extent of movement of said lever in the circumferential and axial directions of said driving element, and projections provided on said pressure plates and engaging the respective arms of said lever, one of said projections comprising means for securing said limiting means to the respective pressure plate.

42. The clutch of claim 41, further comprising means for transmitting torque from said housing to the pressure plate which is secured to said limiting means.

43. The clutch of claim 42, further comprising means for securing said limiting means to said last named pressure plate as well as for fastening said torque transmitting means to the respective plate.

44. The clutch of claim 43, wherein said torque transmitting means comprises a leaf spring.

45. A friction clutch for use in automotive vehicles or other machines having a rotary driving element, comprising a housing secured to said driving element; first and second pressure plates disposed between said housing and said driving element and arranged to normally rotate with said driving element; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, a device defining a fulcrum for said median portion of said lever during movement of said lever to said second position, and means for adjustably securing said fulcrum defining device to said housing.

46. The clutch of claim 45, wherein said fulcrum is adjustable in parallelism with the axis of said driving element.

47. A friction clutch for use in automotive vehicles or other machines having a rotary driving element, comprising a housing secured to said driving element; first and second pressure plates disposed between said housing and said driving element and arranged to normally rotate with said driving elenent; first and second friction discs respectively interposed between said driving element and said housing on the one hand and said first and second pressure plates on the other hand; means for biasing said pressure plates into engagement with the respective friction discs; and disengaging means including at least one release member mounted on said housing and movable from a first to a second position to thereby move one of said pressure plates away from the respective friction disc, at least one changeover lever interposed between said housing on the one hand and said pressure plates on the other hand and movable from a first to a second position to thereby move the other of said pressure plates away from the respective friction disc in response to movement of said release member to said second position, said lever having first and second arms respectively contacting said first and second pressure plates and a median portion between said arms, a member defining a fulcrum for said median portion of said lever during movement of said lever to said second position, said fulcrum defining member being threadedly connected with said housing for movement in parallelism with the axis of said driving element, and means for securing said fulcrum defining member in a selected axial position.

48. The clutch of claim 47, wherein said threadedly connected member is a bolt and said securing means includes a lock nut.

* * * * *